Patented Mar. 1, 1927.

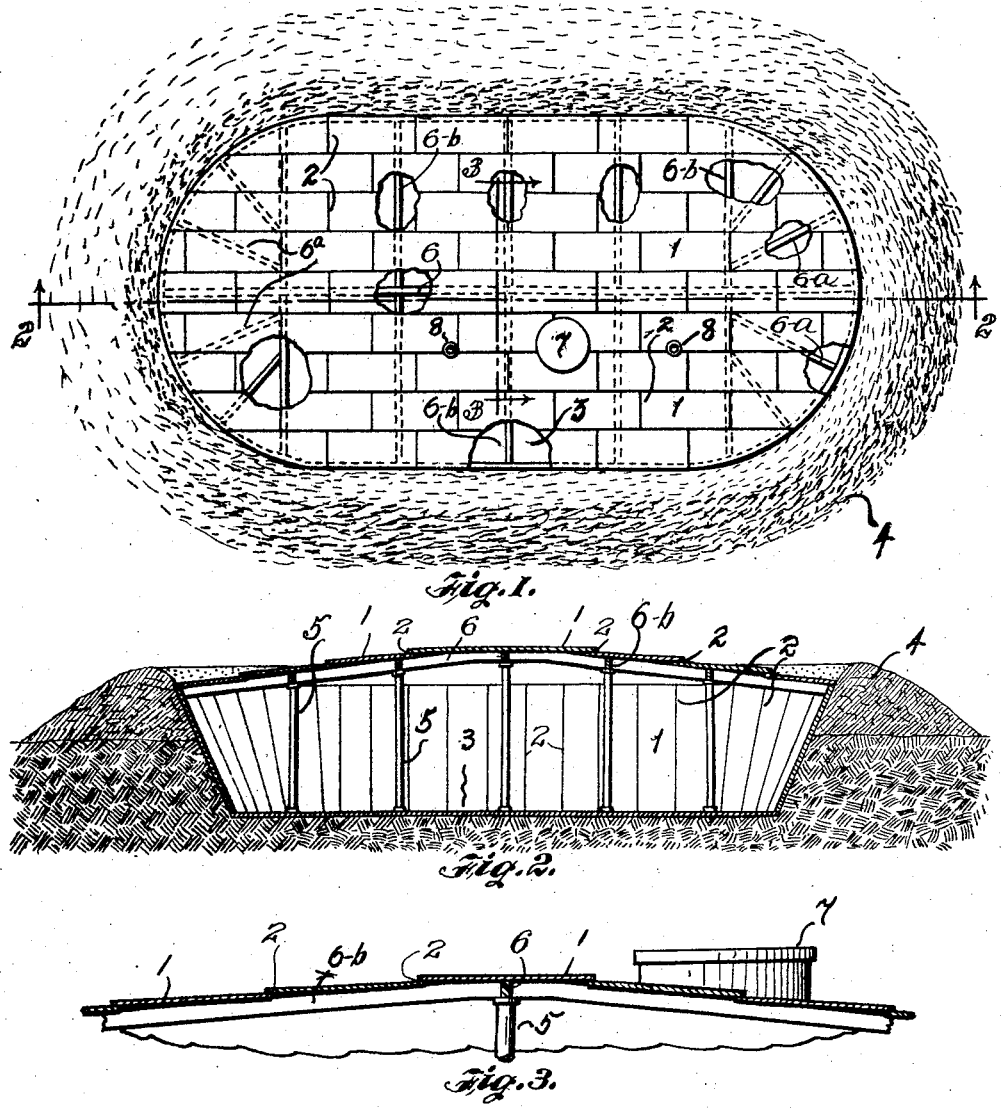

1,618,984

UNITED STATES PATENT OFFICE.

JAMES T. KAVANAUGH, OF PORT RICHMOND, NEW YORK.

OIL-STORAGE TANK.

Application filed March 9, 1926. Serial No. 93,449.

This invention relates to improvements in tanks for the storage of oil, particularly crude oil derived from oil wells, and has for its object to provide a tank or reservoir of a type which may be sunk or placed in a pit in the ground, with an embankment arranged around the upper part of the tank.

The primary object of the invention embodied in a tank of this type is to provide a reservoir of strong, durable and economical construction, with the novel feature of welding together the sheets of metal forming the tank to effect a perfectly tight joint, the sides, top and bottom of the tank being thus formed.

Another object of the invention is to provide an oil storage tank which may be constructed of very light sheets of metal and seating the tank in the earth so that the earth will form a brace to hold the structure together.

With the above and other minor yet important objects in view, the invention will be better and more clearly understood from a perusal of the following description, taken in connection with the accompanying drawings, forming part hereof, and in which:—

Figure 1 is a top or plan view of a storage tank, embodying the invention.

Figure 2 is a longitudinal sectional view, taken along the line 2—2 of Figure 1, and Figure 3 is a partial cross-sectional view, taken along line 3—3 of Figure 1.

In the drawings the tank is preferably of a substantially oblong shape and the bottom, sides and top are formed of steel panels 1, welded together at the joinings 2. The side panels rest upon and are likewise welded to the bottom 3, and as clearly shown are disposed at an oblique angle at the ends of the tank, with respect to the bottom. The bottom of the tank is supported in the pit, the sides being enclosed by the embankment 4 and the sides of the pit.

The top of the tank is formed of panels, the edges overlapping one another, as shown in Figure 2 and are also welded to each other. The top of the tank is supported by steel pipe 5 resting upon the bottom and suitably spaced apart. These pipes 5 are preferably disposed in central longitudinal position, see Figure 2, or may be arranged in any suitable way to support the top. A girder 6 is interposed between the top of the rods and the top of the tank. A manhole is indicated at 7 and 8—8 are air vents for the escape of gas. Girders $6^a$ are also provided at the ends of the tank.

From an inspection of Figure 2 it will be observed that the ends of the tank are rounded, the top, bottom and end panels being so cut as to produce the rounded effect.

The means for supporting the cover of the tank comprises the main girder 6 extending between the top edges of the curved end walls of the tank in a median position with relation to the side walls of the tank. Extending across the tank between the side walls thereof are the transverse girders $6^b$ intersecting the main girder. The transverse girders at the ends of the tank form chords subtending the arcs formed by the semi-circular end walls. Extending from these transverse chord girders to the end walls are the auxiliary girders $6^a$ in approximately radial relation to the curvature of said end walls. The pipes or posts 5 spaced apart along the bottom of the tank engage the under side of the main girder 6 at its intersection with the transverse girders $6^b$. On the frame-work formed by the several girders and supported by the posts is mounted the cover for the tank. The supporting frame and cover are arched to carry any load to which they might be subjected.

From the foregoing it will be apparent that the invention provides a novel, practicable and durable tank and the welding means maintains a tight joining of the metal sheets or panels, thus forming a non-leakable joint. If preferred, the panels may be bolted together. This tank would float on very little water if it happened to be empty at a time of heavy rains and this is provided for by a valve, not shown, which is kept closed by its own weight located on the bottom inside the tank, but at the same time, could not be forced open by oil pressure from the inside. There would never be any danger of fire, as it would be possible to completely cover the roof of this tank with dirt and prevent fire and at the same time prevent evaporation by reason of being kept cool under ground and the whole tank absolutely gas and oil tight, making costly fires almost impossible thereby conserving the oil supply for future generations if stored in this tank.

What is claimed is:

1. An oil storage tank having its bottom, side and end walls formed of joined sheet metal plates, said tank being of an oblong shape with its end walls curved to a semicircular contour, a main girder extending between the end walls of the tank in a median position with relation to the side walls of the tanks; transverse girders extending between the side walls of the tank and intersecting the main girder, a series of posts spaced apart along the bottom of the tank and supporting the main girder, and a cover of joined sheet metal plates mounted on the girders.

2. An oil storage tank having its bottom, side and end walls formed of joined sheet metal plates, said tank being of an oblong shape with its end walls curved to a semicircular contour, a main girder extending between the end of the tank walls in a median position with relation to the side walls of the tank, transverse girders extending between the side walls of the tank and intersecting the main girder with the transverse girders at the ends of the tanks forming chords subtending the arcs of the semi-circular end walls, auxiliary girders extending from the transverse chord girders to the arcuate end walls, a series of posts spaced apart along the bottom of the tank and respectively engaging the main girder at its intersections with the transverse girders; and a cover of joined sheet metal plates mounted on the several girders.

In testimony whereof I affix my signature.

JAMES T. KAVANAUGH.